(12) United States Patent
Reinmuth

(10) Patent No.: US 11,846,509 B2
(45) Date of Patent: Dec. 19, 2023

(54) THREE-AXIS ROTATION RATE SENSOR INCLUDING A SUBSTRATE AND A DOUBLE ROTOR

(71) Applicant: Robert Bosch GmbH, Stuttgart (DE)

(72) Inventor: Jochen Reinmuth, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 74 days.

(21) Appl. No.: 17/648,331

(22) Filed: Jan. 19, 2022

(65) Prior Publication Data
US 2022/0228864 A1 Jul. 21, 2022

(30) Foreign Application Priority Data
Jan. 20, 2021 (DE) .................... 10 2021 200 483.0

(51) Int. Cl.
*G01C 19/5719* (2012.01)
*G01C 19/5712* (2012.01)

(52) U.S. Cl.
CPC ..... *G01C 19/5719* (2013.01); *G01C 19/5712* (2013.01)

(58) Field of Classification Search
None
See application file for complete search history.

(56) References Cited

U.S. PATENT DOCUMENTS

| | | | |
|---|---|---|---|
| 2013/0298672 A1* | 11/2013 | Kuhlmann | G01C 19/56 73/504.12 |
| 2016/0091528 A1* | 3/2016 | Simoni | G01P 15/125 73/504.04 |
| 2017/0284803 A1* | 10/2017 | Andersson | G01C 19/5712 |
| 2018/0266821 A1* | 9/2018 | Zhang | G01C 19/5684 |
| 2020/0263987 A1* | 8/2020 | Blomqvist | G01C 19/5712 |

FOREIGN PATENT DOCUMENTS

| | | |
|---|---|---|
| DE | 112013005703 T5 | 9/2015 |
| DE | 102015207856 A1 | 11/2016 |
| DE | 102017219933 A1 | 5/2019 |
| EP | 1832841 A1 | 9/2007 |

* cited by examiner

*Primary Examiner* — Paul M. West
*Assistant Examiner* — Mark A Shabman
(74) *Attorney, Agent, or Firm* — NORTON ROSE FULBRIGHT US LLP; Gerard Messina

(57) ABSTRACT

A three-axis rotation rate sensor including a substrate and a double rotor. The double rotor includes a first rotor and a second rotor which are elastically connected to one another via a first coupling element so that the two rotors are excitable to rotary oscillations in phase opposition. The first rotor includes a first seismic mass and a second seismic mass that are deflectably supported with respect to the first rotor, and the second rotor includes a third seismic mass and a fourth seismic mass that are deflectably supported with respect to the second rotor. The first mass is connected to the third mass via a first rocker element so that upon a lateral deflection of the first mass, the third mass is deflected in a direction opposite the lateral deflection of the first mass.

10 Claims, 9 Drawing Sheets

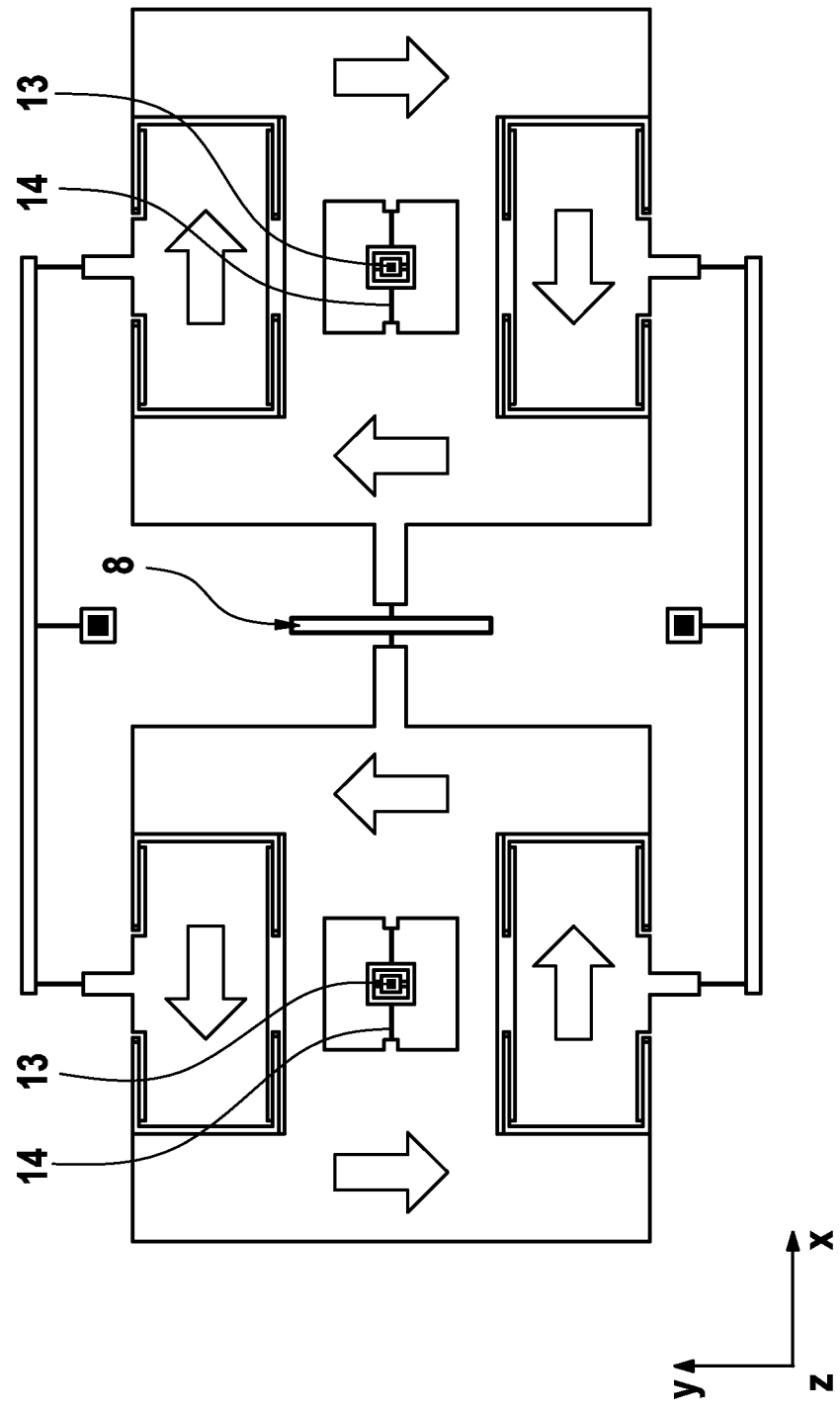

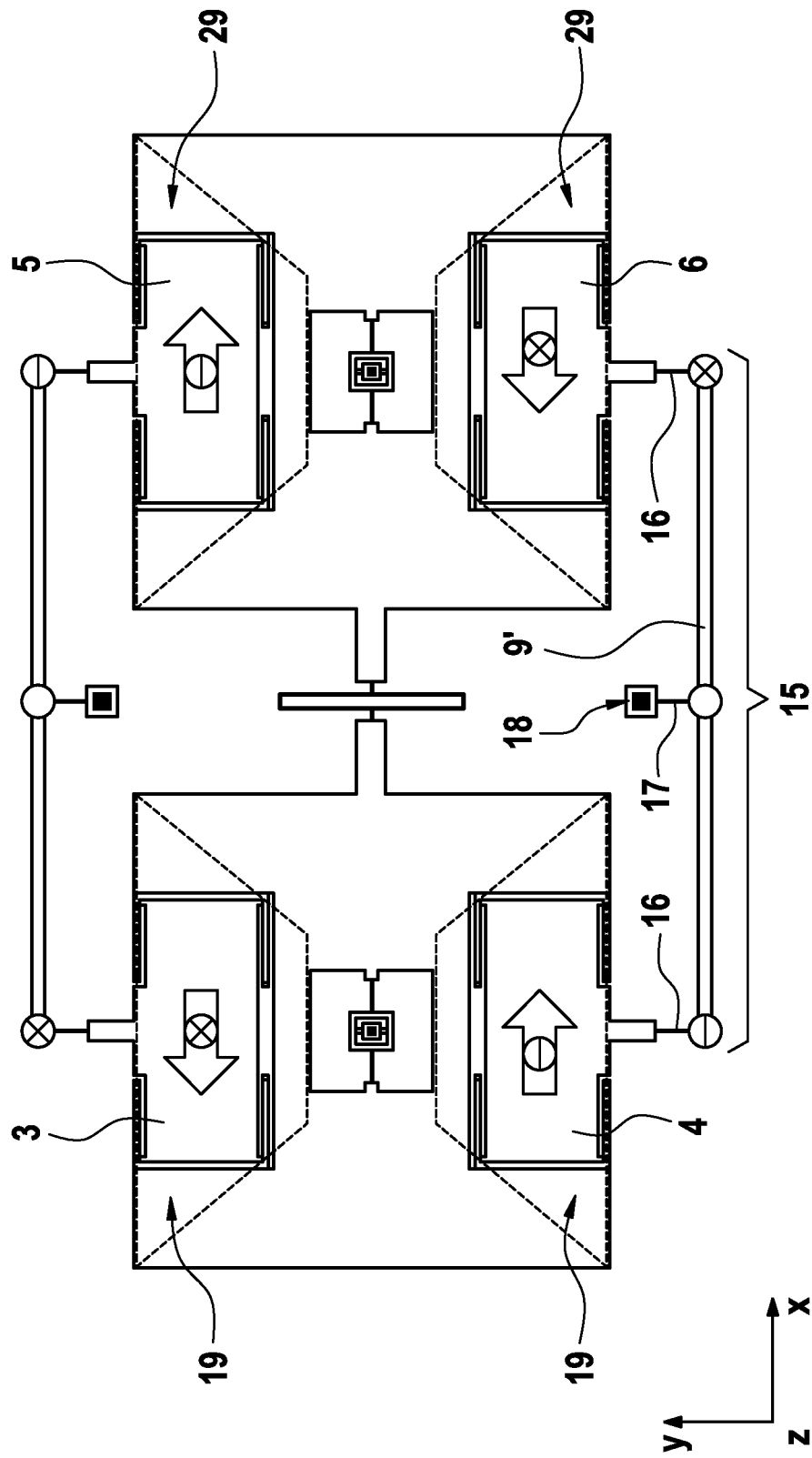

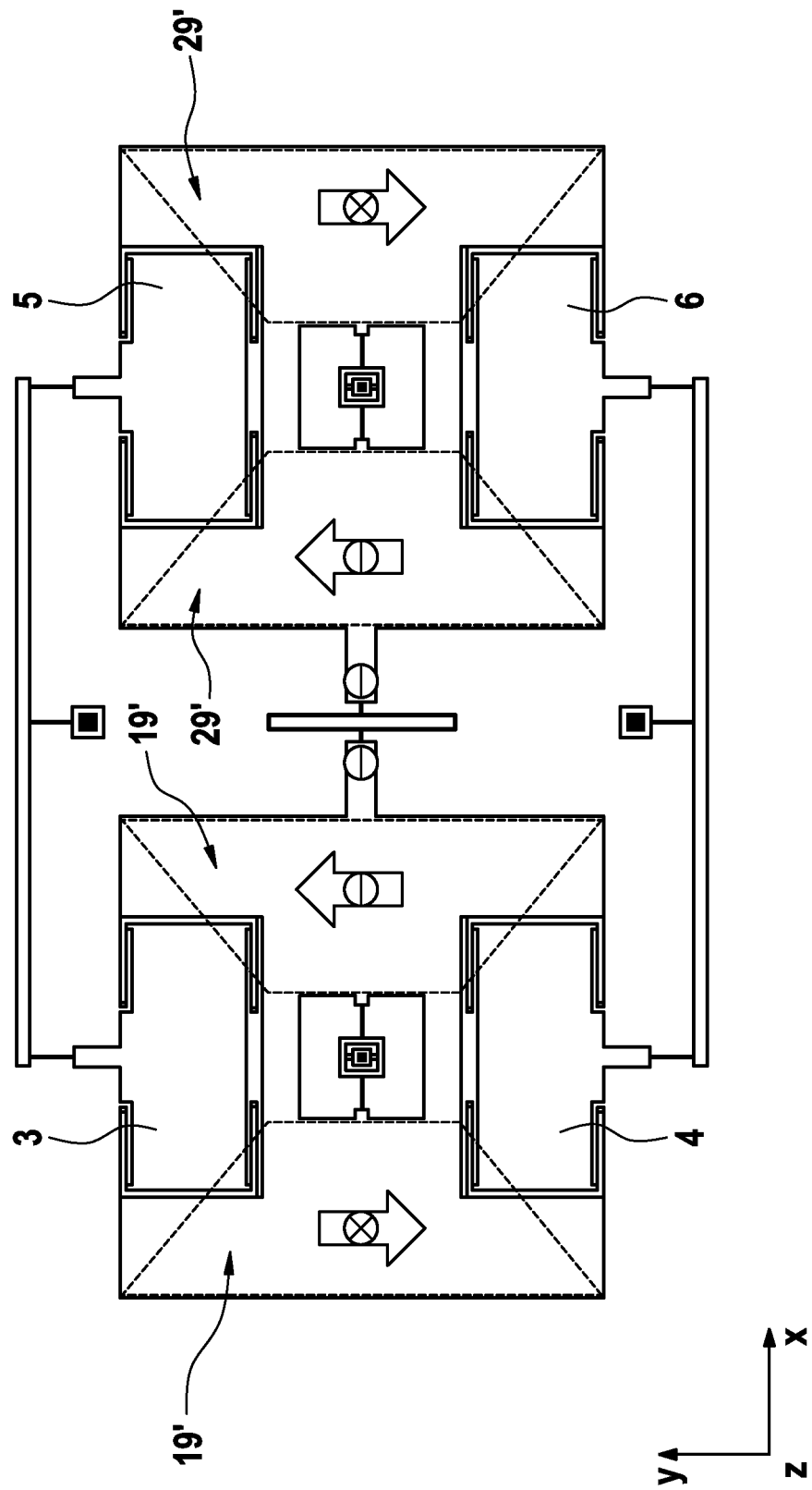

THREE-AXIS ROTATION RATE SENSOR INCLUDING A SUBSTRATE AND A DOUBLE ROTOR

CROSS REFERENCE

The present application claims the benefit under 35 U.S.C. § 119 of German Patent Application No. 10 2021 200 483.0 filed on Jan. 20, 2021, which is expressly incorporated herein by reference in its entirety.

FIELD

The present invention is directed to a three-axis rotation rate sensor.

BACKGROUND INFORMATION

Rotation rate sensor systems in numerous specific embodiments are available in the related art. In one simple variant, for example a rotor is situated in a MEMS functional plane (XY plane) in parallel to a substrate and excited to oscillation. If an external rotation rate is present at the MEMS component in the X or Y direction, the rotor is deflected in the Z direction due to the Coriolis force. This deflection may in turn be determined via a change in capacitance with respect to stationary detection electrodes. It is advantageous to use two detection electrodes that are situated symmetrically with respect to the rotation axis, and whose difference signal is utilized as a rotation rate signal. In this system, an externally applied linear acceleration generates the same change in capacitance for both detection electrodes, as the result of which the difference signal remains unchanged. Thus, the rotation rate signal cannot be disturbed by an externally applied acceleration.

In addition, some conventional systems include two symmetrical rotors which are excited to oscillation in phase opposition and equipped with four symmetrical detection electrodes in each detection direction. The capacitances are coupled crosswise and the resulting difference signal is measured. If an external rotary oscillation having the frequency of the drive oscillation is applied to a single rotor, this rotary oscillation thus generates a deflection of the rotor that is indistinguishable from a rotation rate signal. In contrast, in a system that includes two rotors oscillating in phase opposition, for an externally applied rotary oscillation the signal of the first rotor is exactly compensated for by the signal of the second rotor oscillating in phase opposition. A further advantage of this system is that with the oscillation of the two rotors in phase opposition, no torque is decoupled from the MEMS system. Therefore, no rotational energy can be released to the surroundings, regardless of the installation conditions. In addition, it is advantageous to resiliently support the rotors at their center.

The suspension of the movable structures and the coupling between the Coriolis masses oscillating in phase opposition thus always represent a critical aspect in the design of rotation rate sensors. External interferences such as vibrations, electrical measuring pulses, or the electronic noise of the evaluation circuit may result in the excitation of undesirable oscillation modes, which, depending on the form of oscillation, may result in an error signal or an additional noise component in the signal. Experience has shown that the simpler and more compact the design of the sensor, the less susceptibility it has to interference. Therefore, even a rotation rate sensor that includes only two centrally suspended rotors and possibly also a coupling structure may form a very robust, insensitive system.

For such a system it is disadvantageous that only one rotation rate may be measured in the X and Y directions, while a measurement in the Z direction is not possible. For this purpose, a system for three-axis measurement with the aid of an individual rotor including additional seismic masses for the Z direction is described in European Patent Application No. EP 1 832 841 A1, for example. Although there are various approaches for achieving a detection in the Z direction, also based on the double rotor system, they always require additional elements which are coupled to the movement of the two rotors. Due to the additional elements and their coupling structures, the three-axis rotation rate sensors are generally very complex, and include a very large number of spring elements which in particular are very soft and thus very sensitive to interference from external vibrations or electrical measuring pulses.

SUMMARY

An object of the present invention is to provide a system of a three-axis rotation rate sensor which is robust against vibrations, decouples the smallest possible amount of energy during operation, is insensitive to electrical measuring pulses, may be implemented on a small surface area, and has high sensitivity and good surface area utilization.

The rotation rate sensor according to an example embodiment of the present invention allows detection of external rotation rates with regard to all three spatial directions, the drive movement being the rotary oscillations of the rotors. In the absence of an external rotation rate, the two rotors are initially situated in parallel to the XY plane. When an external rotation whose rotational axis is directed in parallel to the XY plane is applied to the sensor, Coriolis forces act on the rotors and tilt the rotors relative to the plane. In contrast, for an external rotation rate whose rotational axis is perpendicular to the main plane of extension, only radial elongation forces or compression forces, which are not able to effectuate an overall movement of the rotor, act on a fixed rotor. However, the rotors of the sensor according to the present invention themselves once again include deflectable seismic masses which are co-rotated during the rotary oscillation of the rotors, so that the radially extending Coriolis forces effectuate a displacement of the seismic masses in the radial direction of the rotor, which may be correspondingly detected. Due to the first and second coupling elements according to the present invention, the drive oscillations of the two rotors and the detection movements of the seismic masses in each case extend in phase opposition, so that the deflection of the seismic masses may be precisely determined via a difference measurement.

In the sensor according to an example embodiment of the present invention, the rotors thus fulfill a dual function, and function as a detection mass in the X and Y directions as well as in the Z direction, so that a particularly compact sensor may thus be implemented without the need for additional elements. A double rotor may advantageously be designed in a particularly space-saving manner with very good surface area utilization, and may be adapted well to different external boundary conditions. The concept according to the present invention, compared to other three-axis sensors, requires only very few mass elements and coupling elements, so that the sensor has many fewer spurious modes at higher frequencies and is less susceptible to external interferences. In addition, the sensor according to the present invention requires fewer springs overall, and may be implemented in particular with harder springs than with conventional concepts. The sensor is thus significantly less sensitive to variations in the manufacturing process, which result in particularly soft springs that are providable in only a very imprecise manner. Rotation rate sensors that have a narrower frequency distribution than conventional sensors may thus be advantageously manufactured.

The geometric description of the electromechanical structure of the sensor below is based on the main plane of extension of the substrate. The directions in parallel to the substrate are referred to as lateral directions, and the direction perpendicular to the substrate is referred to as the vertical direction. The lateral directions are spanned by an X direction and a Y direction perpendicular to the X direction. The X and Y directions together with the vertical Z direction form a rectangular coordinate system, the relative position of individual components with regard to the Z direction also being referred to by the terms "above" and "below," and vertical movements being referred to as "upward" and "downward."

The two rotors of the double rotor may be spaced apart from one another in the X direction, for example, and are coupled in such a way that they may be excited via the drive, in particular an electrostatic drive, to rotary oscillations in phase opposition relative to the substrate. The rotational axes of both rotors extend in the Z direction, a distinction being made between two rotational directions, one being referred to as clockwise rotation and the other as counterclockwise rotation (based on a view onto the substrate). The rotational axis preferably extends through the center, particularly preferably through the center of gravity, of the particular rotor. The oscillation of the double rotor in phase opposition is understood to mean movements for which the first and second rotors rotate in opposite directions at any point in time. In other words, the first rotor reaches the maximum deflection with regard to the clockwise rotation when the second rotor reaches the maximum deflection with regard to the counterclockwise rotation, and vice versa. Rotations of the overall sensor, in order to distinguish them from rotations of the rotors, are always referred to below as external or externally applied rotations or rotation rates. Each of the two rotors now once again includes only two seismic masses, which are elastically coupled to the particular rotor in such a way that a lateral deflection relative to the rotor is made possible. In the process, the lateral deflection direction of the first mass extends in parallel to the lateral deflection direction of the second mass, and the deflection direction of the third mass similarly extends in parallel to that of the fourth mass. If the two rotors are each in their undeflected rest position with respect to the rotation, the lateral deflection directions of all four seismic masses extend in particular in parallel to one another, for example in the Y direction.

The seismic masses may in particular be partitioned segments of the rotors which are separated from the remainder of the particular rotor by one or multiple recesses and connected thereto by springs. For example, the rotors with regard to their lateral extension may have a rectangular or square shape, while the seismic masses may be rectangular, square, or trapezoidal, for example. To allow the lateral deflections, the springs have a soft design in particular in the deflection direction; i.e., they have a lower spring constant or stiffness in this direction than in the directions perpendicular thereto. The spring constant in the lateral deflection direction is preferably at most half as great as in the lateral direction and/or the vertical direction perpendicular thereto. For this purpose, leaf springs having a high aspect ratio in the Z direction are preferably utilized, the height (extension in the Z direction) being at least twice as great as the width (extension in the lateral direction) of the spring. If the lateral deflection extends in the Y direction, for example, an advantageously high sensitivity in the X direction is thus achieved, the sensitivity remaining virtually unchanged compared to a strict double rotor without Z detection. According to an example embodiment of the present invention, the seismic masses are coupled via the rocker elements in such a way that the lateral deflections of the first and third masses and of the second and fourth masses in each case extend in phase opposition. In particular, during this movement the rocker elements tilt in parallel to the substrate, so that, for example, an end piece of the first rocker element follows the lateral deflection of the first mass, while the oppositely situated end piece follows the lateral deflection of the third mass. According to the present invention, these movements in phase opposition are now once again coupled via the second coupling element in such a way that the lateral deflections of the seismic masses have the following phase relationships: Seismic masses that belong to the same rotor (first and second masses or third and fourth masses) move in phase opposition, and seismic masses that are connected by a rocker element (first and third masses or second and fourth masses) likewise move in phase opposition.

The sensor according to an example embodiment of the present invention is preferably suspended at the substrate only at four points, which are situated centrally and symmetrically relative to one another. As a result, the response of the sensor is much less sensitive to bending that is caused, for example, by mechanical stresses during the further processing. Each of the two rotors preferably includes a single anchor point, it being possible, for example, for the anchor points of both rotors to be situated on a line in parallel to the X direction. Each of the two rocker elements likewise preferably includes an individual anchor point, which particularly preferably is centrally situated with respect to a main direction of extension of the rocker element, so that each rocker element in the longitudinal direction is divided into two subsections which form lever arms of equal length with regard to the anchor point. The anchor points of the two rocker elements may, for example, be situated on a line in parallel to the Y direction and spaced apart from one another in the Y direction. The first coupling element is preferably designed in such a way that it couples not only the drive oscillation of the two rotors, but also the tilting movements of the two rotors, which are caused by an external rotation rate in the X direction. The first coupling element preferably extends between the two rotors in the X direction, and is elastic with respect to an elongation or compression with regard to this direction. In particular, for this purpose the first coupling element may include two or more subsections that extend in the Y direction, and that bend in the X direction upon an elongation or compression of the first coupling element, thus bringing about the desired elasticity. If an external rotation rate is now present in the X direction, during the tilting caused by the Coriolis forces each rotor rotates about an axis in the Y direction, the tiltings of the two rotors taking place in phase opposition due to the opposite rotational directions. The first coupling element now generates in particular a restoring force that is directed in such a way that the two rotors are retracted into the untilted position in parallel to the substrate, so that the oscillations of the tiltings in phase opposition are correspondingly assisted by the coupling. In addition, the two rocker elements may preferably be designed in such a way that they couple the vertical movements of the seismic masses particularly well, it being possible in particular for the main direction of extension of the rocker elements to extend in parallel to the X direction. The first rocker element preferably couples the vertical movement (relative to the substrate) of the first and third seismic masses in such a way that during a vertical deflection of the first mass, the third mass is deflected in a direction opposite the vertical deflection of the first mass, and vice versa. In other words, an upward movement of the first mass is linked to a downward movement of the second mass (and vice versa). During these movements of the first and third masses, the rocker element tilts in particular out of its rest position extending in parallel to the substrate, so that a first end piece of the rocker element connected to the first mass migrates upwardly, while the oppositely situated end piece connected to the third mass moves downwardly (and vice versa). The second and fourth seismic masses are analogously coupled via the second rocker element. The mass elements, in each case coupled in pairs, are in turn coupled to one another via the second coupling element. Due to the second coupling element, for example in the form of a torsion spring, it is possible for a restoring force to be achieved between tiltings of the rocker elements in phase opposition.

In the system according to an example embodiment of the present invention, all detection masses in each case are thus coupled to one another in all detection directions by the first and second coupling elements and the two rocker elements. As a result of the coupling of all individual detection masses, these detection masses in each case oscillate at the exact same frequency. In contrast to uncoupled systems, it is thus possible to avoid undesirable "beats" in the detection movement. In addition, this results in the option to shift the frequencies of the detection movements via additional electrodes in such a way that these frequencies have the same value as the frequency of the drive movement. A further increase in quality in the detection is thus achieved which is made possible by particularly sensitive sensors. In addition, sensors that are operated using a particularly advantageous closed-loop concept may thus be implemented.

Advantageous embodiments and refinements of the present invention are apparent from the description herein with reference to the figures.

The two rotors are preferably connected to the substrate at their center, in particular at their center of gravity, via at least one spring. The rotational axis of the rotors particularly preferably likewise extends through the center or the center of gravity. The attachment of a rotor to the substrate may be achieved via an anchor point, for example, at which one, two, or more springs that extend in parallel to the substrate and that are connected to the rotor are situated. The at least one spring may in particular be designed as a hard spring, so that compared to softer springs (i.e., in particular springs having a small width) it may be manufactured with less process variation.

The arrangement and the geometric shape of the double rotor, the seismic masses, and the coupling elements may advantageously be symmetrically designed, so that the forces and torques generated by the detection elements that are moved in phase opposition exactly compensate for one another. A transfer of kinetic energy to the substrate and an offset in the measuring signal generated by the corresponding detection movement may advantageously be prevented in this way. The following statements concerning symmetry always refer to the lateral arrangement, shape, and extension of the individual elements; i.e., the symmetry relationships are described as two-dimensional symmetries with respect to the main plane of extension. In the three-dimensional arrangement, symmetry planes that are spanned by the axis of symmetry and the Z direction correspond to the particular stated axes of symmetry. The entire sensor structure is preferably to be designed symmetrically, so that interferences of any type are already compensated for based solely on the symmetry.

According to one preferred specific embodiment of the present invention, it is provided that the double rotor is designed axially symmetrically with respect to a first and/or a second axis of symmetry, the first axis of symmetry extending in the Y direction and being centrally situated between the two rotors, and the second axis of symmetry extending in the X direction through a center, in particular a center of gravity, of the first rotor and a center, in particular a center of gravity, of the second rotor. The two rotors are in particular spaced apart in the X direction, and have a mirror-image design with respect to one another with regard to the first axis of symmetry extending between them. Each of the two rotors may in particular be designed mirror-symmetrically with respect to the second axis of symmetry extending through its respective center. The first and second masses and the third and fourth masses in each case are preferably mirror images with regard to the second axis of symmetry. It is particularly preferred that the spring systems via which the seismic masses are connected to the particular rotor are also correspondingly symmetrically designed.

According to one specific embodiment of the present invention, the first rotor is designed axially symmetrically with respect to a third axis of symmetry, and/or the second rotor is designed axially symmetrically with respect to a fourth axis of symmetry, the third axis of symmetry extending in the Y direction through a center, in particular a center of gravity, of the first rotor, and the fourth axis of symmetry extending in the Y direction through a center, in particular a center of gravity, of the second rotor. Each of the two rotors is preferably designed mirror-symmetrically with respect to its center axis extending in the Y direction. The seismic masses situated at the rotors are likewise designed mirror-symmetrically with respect to the third and/or fourth axes/axis of symmetry; i.e., each of the masses is preferably symmetrical with respect to the axis of symmetry of the particular rotor extending in the Y direction. It is particularly preferred that the spring systems of the seismic masses also have the corresponding symmetry.

The first coupling element is preferably a first spring element that is centrally situated between the rotors, the first spring element being formed in particular by at least one leaf spring that is preferably oriented predominantly in the Y direction. For this purpose, the first spring element particularly preferably includes one or multiple subsections that extend in the Y direction and correspondingly bend in the X direction when there is load on the spring element in the X direction. The first spring element may, for example, include one or multiple U- or O-shaped sections that are spread apart under load in the X direction. Alternatively, a meandering sequence of subsections is also possible. The first spring element with regard to a bend in the Z direction is preferably at least twice as stiff as in the Y direction. For this purpose, a leaf spring having a high aspect ratio in the Z direction is preferably utilized, for example with a height that is at least twice the width of the spring.

According to one preferred specific embodiment of the present invention, it is provided that the rocker elements each include a lever element that is connected to a seismic mass of the first rotor via a second spring element, and is connected to a seismic mass of the second rotor via a third spring element, the second and third spring elements in each case preferably being centrally situated at a seismic mass and/or the lever element being anchored to the substrate via a fourth spring element, the fourth spring element particularly preferably being centrally situated at the lever element and/or extending from the lever element in the direction of a center of the double rotor. The attachment of the spring elements to the particular seismic mass is preferably situated in the center (with respect to the X direction) of the mass. For this purpose, a leaf spring having a high aspect ratio is preferably utilized, in particular a leaf spring whose height is at least twice the width of the spring. The lever element is anchored to the substrate via at least one fourth spring element, the fourth spring element and the anchor being oriented toward the center of the double rotor to enable a compact design. It is advantageous for each of the two rocker elements to be designed mirror-symmetrically with respect to the first axis of symmetry, and to use two identical rocker elements that have a mirror-image design with respect to one another with regard to the second axis of symmetry. Energy decoupling and an offset in the measuring signal are in turn avoided in this way.

According to one preferred specific embodiment of the present invention, the second coupling element includes a first and a second additional arm and a bending element, the first additional arm being situated at the first rocker element and the second additional arm being situated at the second rocker element, the bending element connecting the first additional arm to the second additional arm. The additional arms are preferably symmetrically and centrally mounted between the two rotors, at the lever element of the particular rocker element, in order to avoid an offset. The bending element connecting the two additional arms is preferably designed as a leaf spring, for this purpose it being possible to utilize a leaf spring having a high aspect ratio, in particular a leaf spring whose height is at least twice its width. The length of the leaf spring is preferably selected to be smaller than the length of the additional arms, i.e., smaller than the Y section of the additional arms between the lever element and the bending element, so that a parallel deflection of the seismic masses is particularly strongly suppressed.

The second coupling element, at least in one subarea, is preferably situated above or below the first coupling element or includes, at least in one subarea, two subelements extending in parallel, one subelement being situated above the first coupling element and the other subelement being situated below the first coupling element. In other words, the first coupling element extending in particular in the X direction and the second coupling element extending in particular in the Y direction intersect in an area between the rotors, and the second coupling element is guided in the intersection area in a plane below or above (or below and above) the first coupling element. In particular, it is advantageous to achieve the connection between the additional arms and the bending element via a mechanical bridge that spans a portion of the first coupling element. For this purpose, for example the bending element may be connected to a bridge element in a second functional layer that is vertically spaced apart from the functional layer of the rotors. If only a thin second functional layer is providable in the manufacturing process, it is advantageous to prevent the kinking between the two lever arms by use of an additional spring element that has a soft design in the X direction but a stiff design in the Z direction, and is connected on one side to the substrate and on the other side to the lever element. The bridge element may be situated below or above the first coupling element or may branch into two parallel subelements, one of which is situated above, and the other below, the first coupling element. The bridge element is then guided through in a subarea below or above the first coupling element and in each case connected to a lever arm. A bridge element that is connected both below and above the first coupling element is advantageous, so that under load, kinking between the two lever arms in the area of the bridge element may be avoided.

A first detection electrode system situated below and/or above the first rotor is preferably designed symmetrically with respect to the second and/or third axes/axis of symmetry, and/or a second detection electrode system situated below and/or above the second rotor is designed symmetrically with respect to the second and/or fourth axes/axis of symmetry. In particular, tilting of the first rotor, caused by the effect of an external rotation having a rotational axis in the X or Y direction, is detected via the first detection electrode system. The first and second detection electrode systems preferably each include at least four electrode surfaces, the four electrodes of the first rotor each being situated mirror-symmetrically with respect to the second and third axes of symmetry, while the four electrodes of the second rotor are situated mirror-symmetrically with respect to the second and fourth axes of symmetry. The arrangement and also the lateral shape of the individual electrode surfaces (trapezoidal, for example) conform to the double mirror symmetry. Tilting with its rotational axis in the X direction may thus be achieved via a difference measurement between the two electrode surfaces situated opposite one another in the Y direction. For this purpose, perpendicular tilting may be analogously determined using the respective other electrode pair. Asymmetrical forces brought about by electrical pulses on the electrodes are advantageously avoided by a symmetrical electrode system. The detection electrodes for the X and Y detection may be provided, for example, below (or above, or below and above) the rotors. It is particularly advantageous when the X detection electrodes may also be provided below the seismic masses, so that these surfaces are not lost and instead may have a double use.

According to one preferred specific embodiment of the present invention, it is provided that a third detection electrode system is configured for detecting a lateral deflection of the first and second seismic masses, and a fourth detection electrode system is configured for detecting a lateral deflection of the third and fourth seismic masses, the third and fourth detection electrode systems including an electrode surface that is situated perpendicularly with respect to the substrate. The detection of a rotation rate directed in the Z direction may be achieved in a particularly advantageous manner via perpendicularly situated detection surfaces, which in particular are provided at the lever elements or coupled to the lever elements. In this way, the lever elements are advantageously also moved during the detection movement but do not follow the drive movement, so that a particularly low-interference rotation rate signal may be achieved. It is advantageous, the same as in the X and Y directions, to provide at least four electrode surfaces and arrange them in pairs and connect them in such a way that an externally applied rotary oscillation is exactly compensated for in the difference signal, so that no interference signal results.

According to one preferred specific embodiment of the present invention, the third and fourth detection electrode systems are designed in such a way that they detect rotational movements of the rocker elements whose rotational axes extend perpendicularly with respect to the main plane of extension. For an external rotation whose rotational axis extends in parallel to the Z direction, the seismic masses are deflected in the lateral direction, and the rocker elements follow this movement via a rotational movement about the Z direction (i.e., by tilting in parallel to the substrate). In particular, for example one end piece of the first rocker element follows the lateral deflection of the first mass, while the oppositely situated end piece follows the lateral deflection of the third mass. The associated deflection of the seismic masses may be determined via the rotation of the rocker elements. The rotational movement of the rocker elements may be detected in particular in that the third and fourth detection electrode systems each include electrodes that are fixedly connected to the substrate, and include further electrodes that are fixedly connected to the rocker elements. The rotation of the rocker elements relative to the substrate may thus be capacitively determined via the relative displacement of the associated electrodes.

For a symmetrical design with the above-described arrangements of the detection electrodes, the sensor is insensitive in all directions to an external acceleration or rotational acceleration. An exception is for an acceleration in the X direction, which may result in deflection of the lever elements corresponding to an ostensible Z rotation rate. It is advantageous to select the mass distribution of the lever elements together with additional arms and the bending element as well as the suspension of the lever elements in such a way that in the event of an acceleration in the X direction, the lever elements are compensated for in such a way that they carry out a pure displacement in the X direction, not a rotational movement.

Exemplary embodiments of the present invention are illustrated in the figures and explained in greater detail in the following description.

BRIEF DESCRIPTION OF THE DRAWINGS

FIGS. 2A-2D schematically show the drive movement of the specific embodiment of the rotation rate sensor according to an example embodiment of the present invention.

FIG. 3 schematically shows the detection movement for an external rotation rate that is oriented in the Y direction.

FIG. 4 schematically shows the detection movement for an external rotation rate that is oriented in the X direction.

DETAILED DESCRIPTION OF EXAMPLE EMBODIMENTS

Figure 1:
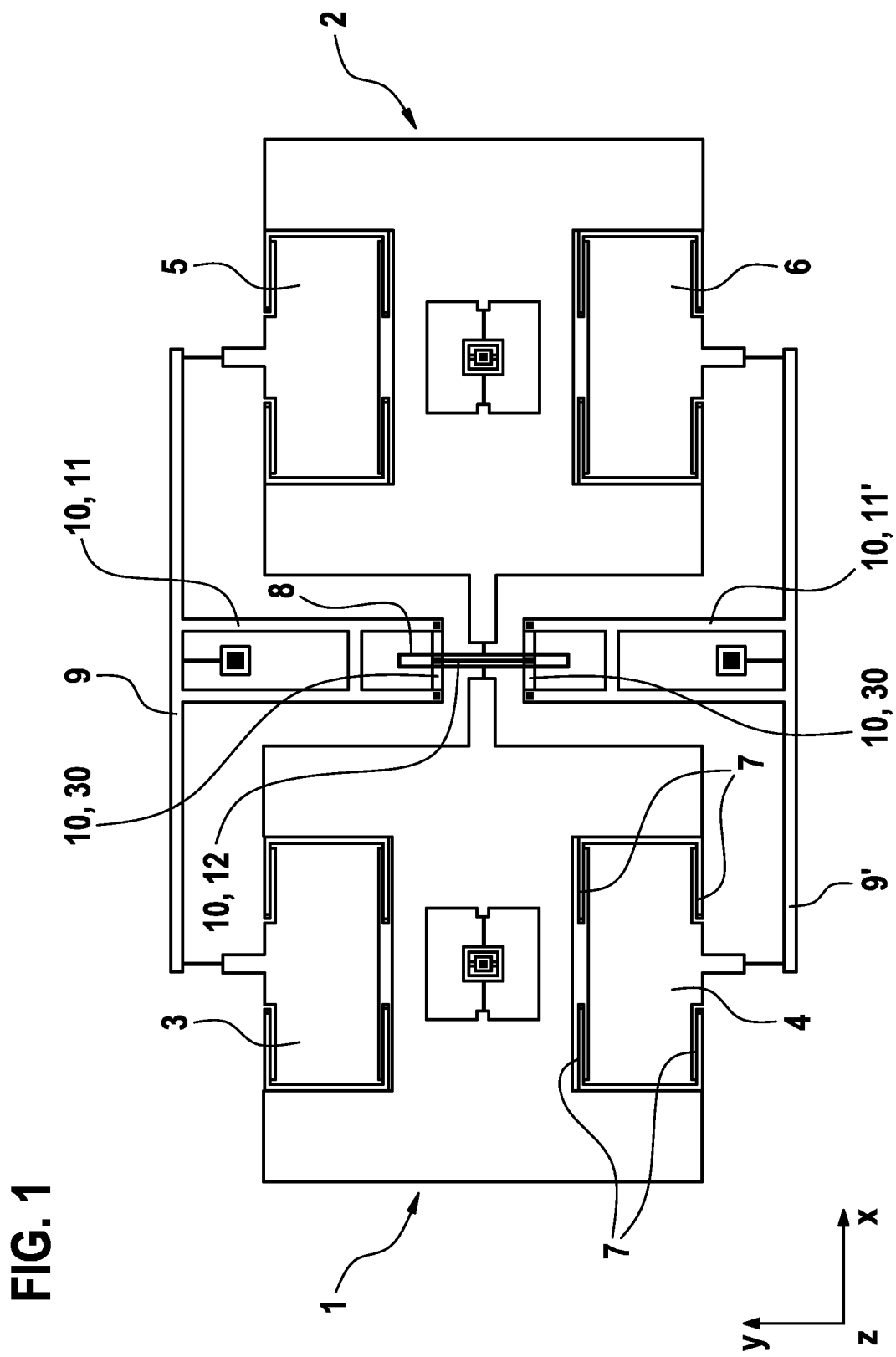
FIG. 1 schematically shows one specific example embodiment of the rotation rate sensor according to the present invention.

FIG. 1 schematically illustrates the sensor system according to the present invention. The base element is formed by a double rotor that oscillates in phase opposition. Two seismic masses 3, 4 and 5, 6 are respectively partitioned in the two rotors 1, 2, and are softly supported in a direction perpendicular to the oscillation axis of the rotors via springs 7. The two rotors are coupled to one another via a first coupling element 8, which in the illustrated design includes a centrally situated O-shaped section which under load is spread apart in the X direction. Each of the partitioned masses of a rotor 1, 2 are coupled to one another (mass 3 to mass 5, and mass 4 to mass 6]) via a rocker element 9 or 9', respectively. A lateral deflection of masses 4 and 6 or 3 and 5 in phase opposition is forced by rocker elements 9, 9' (cf. FIGS. 5A-5D). The two rocker elements 9, 9' are connected via a second coupling element 10 made up of two additional arms 11, 11', which in turn are connected to one another via a bending element 12. In the illustrated arrangement, which is particularly advantageous, coupling structure 8 of the two rotors 1, 2 and coupling structure 10 of the two rocker elements 9, 9' are situated between the two rotors, in the central area in which the two coupling elements 8 and 10 intersect, a mechanical bridge 30 being implemented which allows an independent movement of both structures in this area. For this purpose, the coupling element includes two subsections 30 (bridge elements) that extend below the O-shaped section of first coupling element 8.

The illustrated arrangement has multiple axes of symmetry, via which a transfer of kinetic energy to the substrate and an offset in the measuring signal generated by the corresponding detection movement may advantageously be prevented. The two rotors 1, 2, their seismic masses 3, 4, 5, 6, rocker elements 9, 9', and coupling elements 8, 10 in each case are mirror-symmetrically designed with respect to the center axes of the double rotor extending in the X and Y directions. The axis of the illustrated right-left mirror symmetry of the arrangement is referred as the first axis of symmetry, while the second axis of symmetry is associated with the mirror symmetry between the lower and upper halves. In addition, each rotor 1, 2 has a mirror axis that is oriented in the Y direction, referred to as the third or fourth axis of symmetry, respectively. Springs 7 of seismic masses 3, 4, 5, 6 and anchoring elements 13, 14 of rotors 1, 2 (cf. FIGS. 2A-2D) preferably have the same symmetry as the rotors.

Figure 2B:
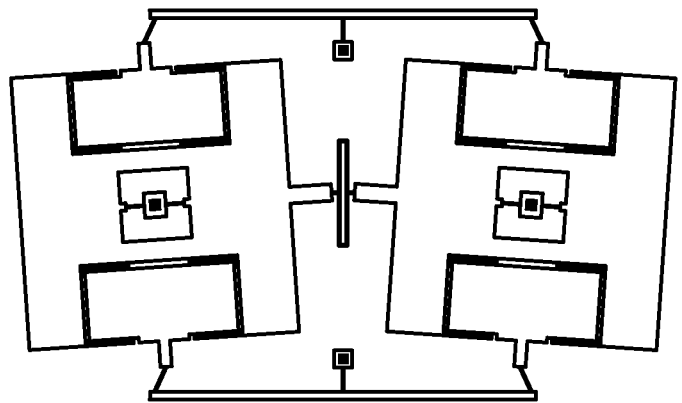
Figure 2C:
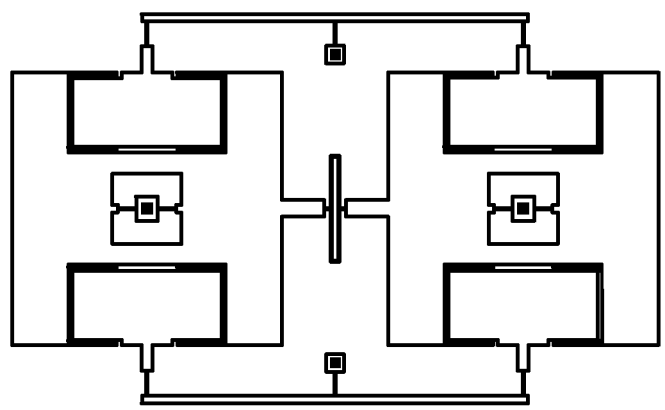
Figure 2D:
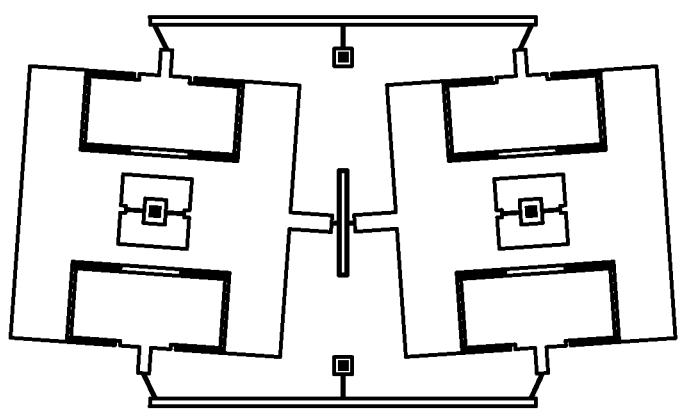

FIGS. 2A-2D illustrate the drive movement of the double rotor. In order to clearly illustrate the movement, second coupling element 10, which does not take part in this movement, is not depicted. As indicated by the arrows in FIG. 2A, rotors 1, 2 are set into rotary oscillations in phase opposition by a drive (not illustrated). At the point in time illustrated in FIG. 2A, both rotors 1, 2 are in their zero position (cf. the rest state of the double rotor in FIG. 2C), and left rotor 1 completes a counterclockwise rotation, while right rotor 2 carries out a clockwise rotation. FIG. 2B schematically illustrates the associated maximum deflection, while FIG. 2D depicts the maximum deflection in oscillation phase opposition (clockwise rotation of rotor 1, counterclockwise rotation of rotor 2). To enable the rotary oscillation of rotors 1, 2, rotors 1, 2 in the area of their center of gravity each include a central recess in which they are connected to an anchor point 13 via spring elements 14.

FIG. 3 schematically shows the movement of seismic masses 3, 4, 5, 6, via which an external rotation extending in parallel to the Y axis is detected. In order to clearly illustrate the movement, second coupling element 10, which does not take part in this movement, is not depicted. Due to the rotary oscillation of rotors 1, 2 in phase opposition, each of masses 3, 4, 5, 6 in the illustrated pass moves through the zero position in the positive or negative X direction. As a result of the Coriolis forces that act due to the external rotation, masses 3 and 6 in their drive movement in the negative X direction are each deflected in the negative Z direction (i.e., downwardly). Masses 4 and 5 moved in phase opposition are correspondingly deflected in the positive Z direction (upwardly). The coupling of the detection movements of masses 3, 4, 5, 6 takes place via the two rocker elements 9, 9', which in each case are made up of a lever element 15 that is connected to masses 4, 6 or 3, 5 via two springs 16 (second and third spring elements) and attached to anchor point 18 via a spring 17 (fourth spring element). Due to the tilting movement of levers 15 connected to seismic masses 3, 4, 5, 6, the detection movements of masses 3, 4, 5, 6 are coupled in such a way that masses 3 and 5 or masses 4 and 6 are in each case deflected in phase opposition in the Z direction. The Z deflection is measured by detection electrode systems 19 and 29 situated above and/or below the double rotor, in each case the difference in the change in capacitance of electrode pairs 19 or 29 being entered into the measuring signal. It is particularly advantageous to provide X detection electrodes 19, 29 below partitioned masses 3, 4, 5, 6, so that these surfaces are not lost and instead may have a double use.

FIG. 4 schematically shows the movement of seismic masses 3, 4, 5, 6, via which an external rotation extending in parallel to the X axis is detected. In order to clearly illustrate the movement, first coupling element 8, which does not take part in this movement, is not depicted. The coupling of the detection movement takes place via the two rocker elements 9, 9'. As a result of the Coriolis forces, the right side of rotor 1 (which moves in the positive Y direction) tilts upwardly, while the left side (which moves in the negative Y direction) is tilted downwardly. The tilting of second rotor 2 takes place as a mirror image thereof. First coupling element 8 is advantageously designed in such a way that it couples not only the drive oscillation of the two rotors 1, 2, but also the tilting movements of the two rotors 1, 2. Due to the O-shaped section of coupling element 8, an elastic connection forms between rotors 1, 2, via which rotors 1, 2 are retracted into the untilted position. The detection takes place via detection electrode systems 19' and 29', analogously to FIG. 3.

Figure 5A:
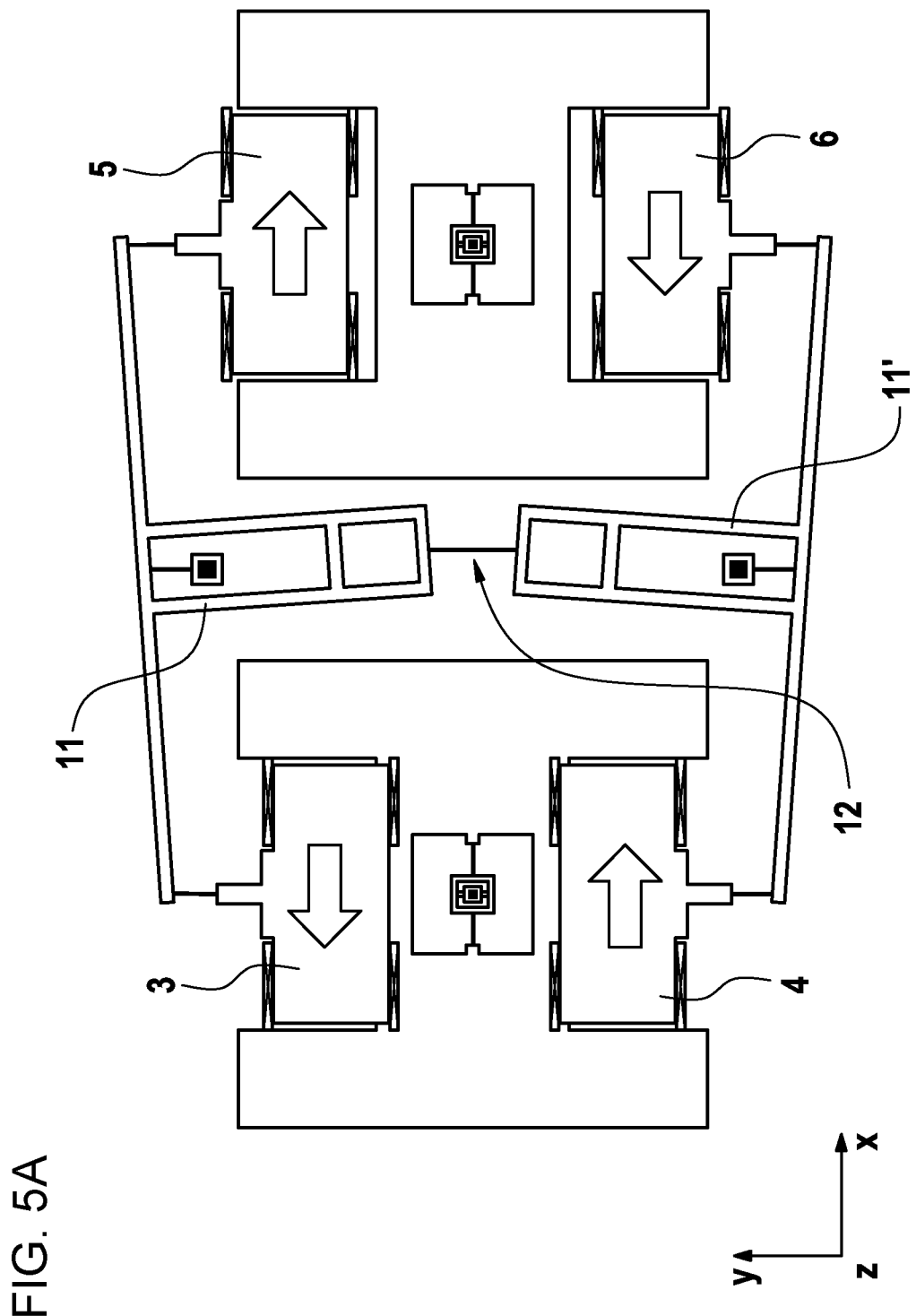
FIGS. 5A-5D schematically show the detection movement for an external rotation rate that is oriented in the Z direction.
Figure 5B:
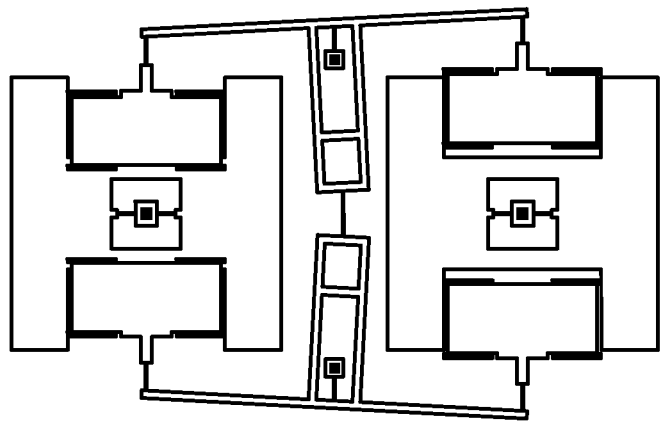
Figure 5C:
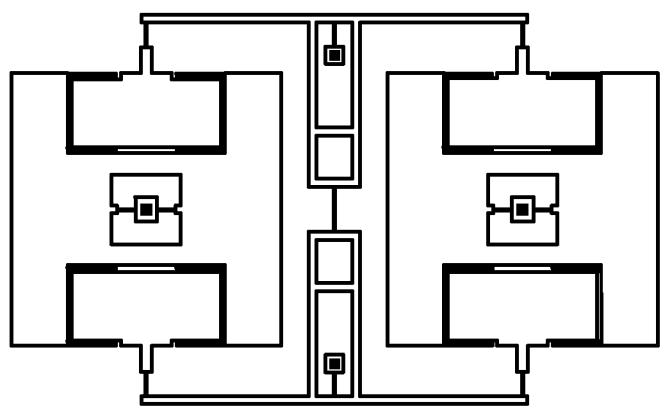
Figure 5D:
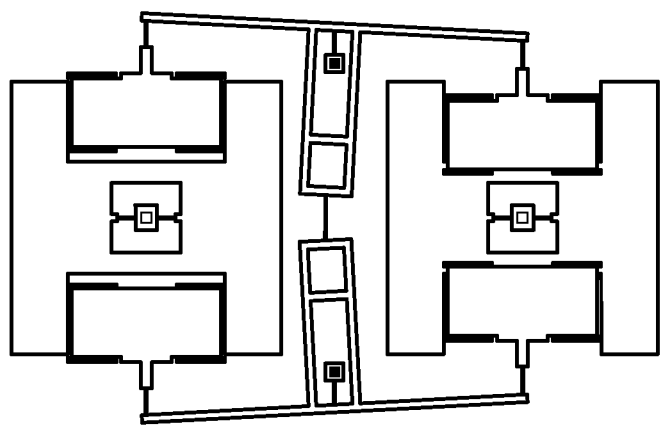

FIGS. 5A-5D schematically show the movement of seismic masses 3, 4, 5, 6, via which an external rotation extending in parallel to the Z axis is detected. As illustrated in FIG. 5A, masses 3, 4 of first rotor 1 (in counterclockwise rotation) are moved by the Coriolis forces toward the center of rotor 1, while masses 5, 6 of second rotor 2 are moved away from the center of rotor 2. These movements of masses 3, 4, 5, 6 in phase opposition are assisted by second coupling element 10, in that on the one hand it couples the lateral detection movements of masses 3 and 5 and the lateral detection movements of masses 4 and 6 to one another, and on the other hand these pairwise movements are once again coupled to one another via spring element 12 situated between additional arms 11, 11'. FIGS. 5A and 5B show the lateral deflections of the seismic masses when left rotor 1 undergoes a counterclockwise rotation and right rotor 2 undergoes a clockwise rotation. In FIG. 5D, left rotor 1 undergoes a clockwise rotation and right rotor 2 undergoes a counterclockwise rotation, and FIG. 5C shows the rest state of the double rotor for comparison.

Figure 6:
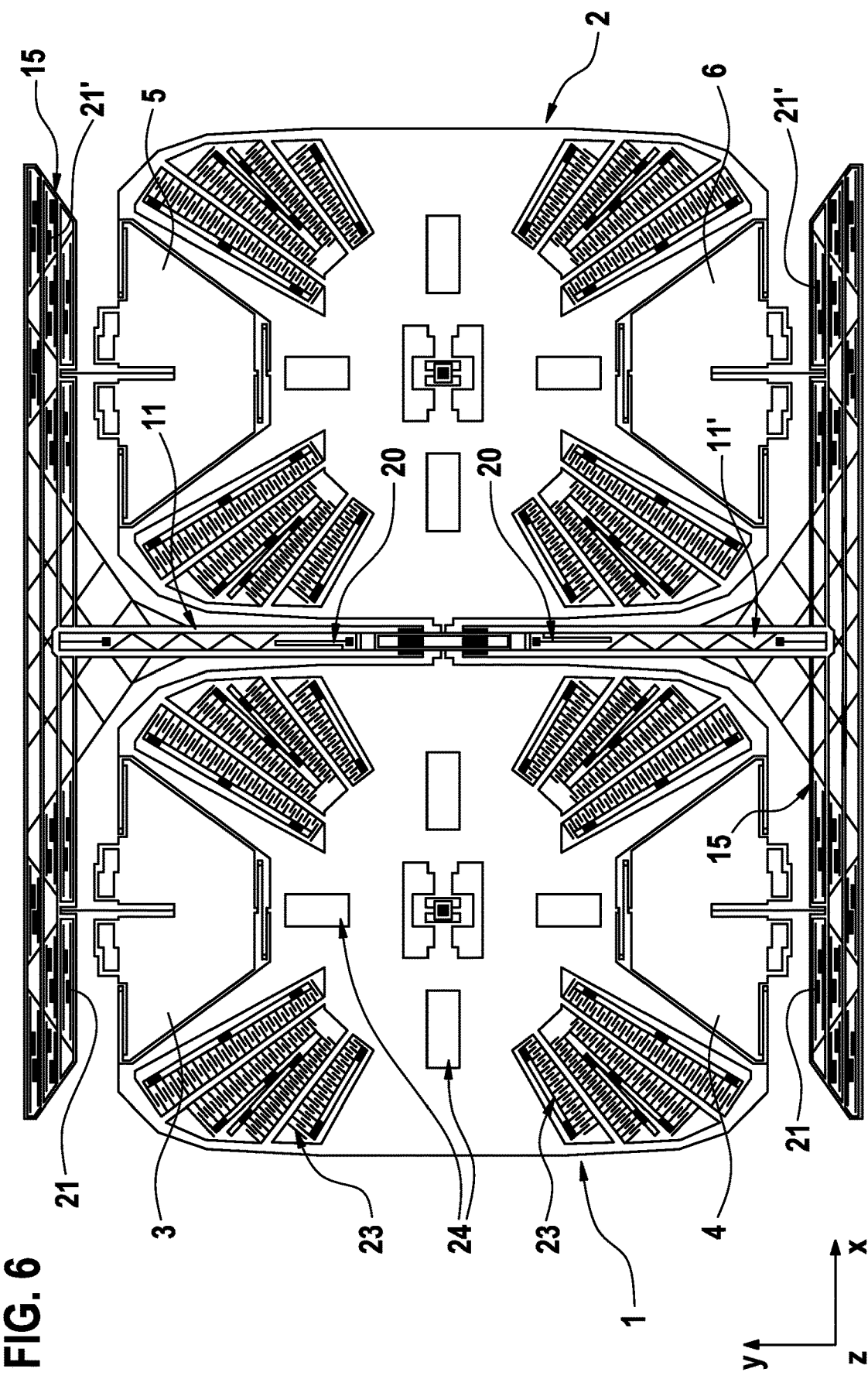
FIG. 6 schematically shows a further specific example embodiment of the rotation rate sensor according to the present invention.

FIG. 6 illustrates a particularly advantageous implementation of the sensor design according to the present invention. The high level of surface area utilization resulting from the large surface area component of rotors 1, 2 is apparent. Drive electrodes 23 are implemented in the form of comb electrodes that are fixedly connected to rotors 1, 2 and that electrostatically couple to comb electrodes that are fixed to the substrate. In this embodiment, this complete integration of drive combs 23 into rotors 1, 2 is advantageous, in particular with regard to the very large rotors that are present. In this specific embodiment, in addition surfaces 24 for quadrature compensation in all three spatial directions are provided, which in this design, however, are not actively operable. If only a thin second functional layer is providable in the manufacturing process, it is advantageous to prevent the kinking between the two lever arms 11, 11' by use of an additional spring element 20 which has a soft design in the X direction but a stiff design in the Z direction, and which on one side is connected to the substrate, and on the other side is connected to particular lever arm 15.

The detection of the Z rotation rate is achieved here via perpendicularly situated detection surfaces 21, 21' that are situated at lever arms 15, or that alternatively may also be coupled to the lever arms. This is particularly advantageous, since although lever arms 15 follow the detection movement, they do not also carry out the drive movement, so that a particularly low-interference rotation rate signal may be achieved. It is also advantageous to provide at least four detection surfaces 21, 21' in the X and Y directions, and to arrange them in pairs and connect them in such a way that an externally applied rotary oscillation is exactly compensated for in the difference signal, so that no interference signal results.

Figure 7A:
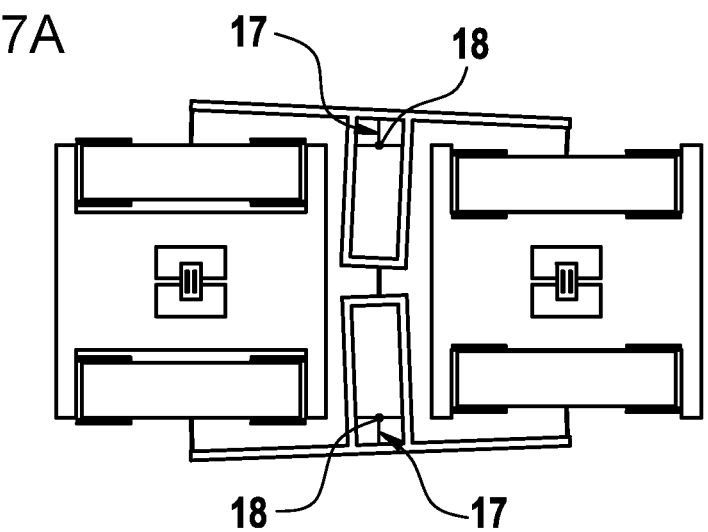
FIGS. 7A-7C illustrate a preferred design of the rocker structure, in accordance with an example embodiment of the present invention.
Figure 7B:
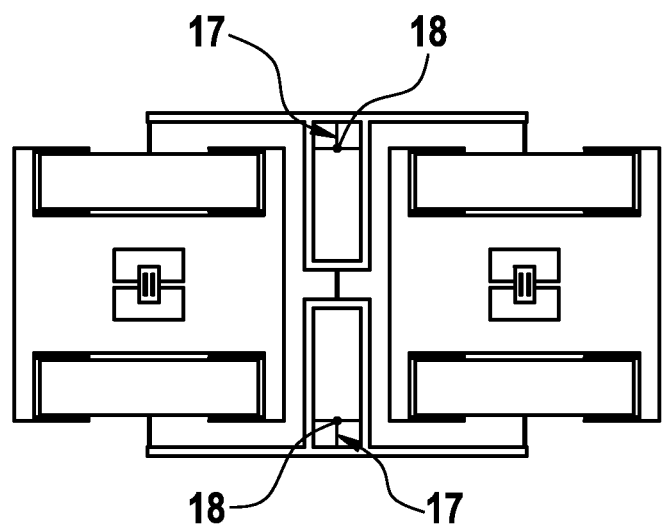
Figure 7C:
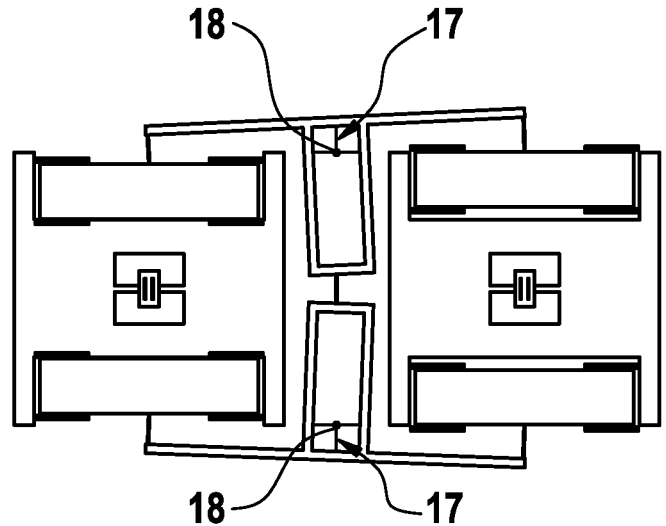

FIGS. 7A-7C illustrate the correct design of the suspension of lever element 15. Lever elements 15 are each anchored to the substrate via a spring element 17 that is connected to an anchor point 18. FIGS. 7A, 7B, and 7C show how the rocker structure may be symmetrized with regard to an acceleration that is applied in the X direction, so that an external acceleration is not able to produce an error signal in the Z rotation rate signal. The symmetrization takes place via a suitable choice of the length of spring 17 and the corresponding positioning of anchor point 18. FIG. 7A shows an undercompensated arrangement, FIG. 7B shows the correctly compensated arrangement, and FIG. 7C shows an overcompensated arrangement.

For a symmetrical design with the above-described arrangements of the detection electrodes, the sensor is insensitive in all directions to an external acceleration or rotational acceleration. One exception is for an acceleration in the X direction, which may result in deflection of lever arms 15 corresponding to an ostensible Z rotation rate (cf. FIGS. 7A and 7C). The mass distribution of lever elements 15 together with additional arms 11, 11' and bending element 12 as well as suspension 18 of lever elements 15 is advantageously to be selected in such a way that in the event of an acceleration in the X direction, lever elements 15 are compensated for in such a way that they carry out a pure displacement in the X direction (cf. FIG. 7B), not a rotational movement.

What is claimed is:

1. A three-axis rotation rate sensor, comprising:
   a substrate having a main plane of extension with an X direction and a Y direction; and
   a double rotor including a first rotor and a second rotor which are each elastically connected to the substrate via a suspension, and elastically connected to one another via a first coupling element in such a way that the first and second rotors are excitable to rotary oscillations in phase opposition, rotational axes of the first and second rotors extending in a vertical Z direction perpendicular to the substrate;
   wherein the first rotor includes a first seismic mass and a second seismic mass that are deflectably supported with respect to the first rotor, a lateral deflection direction of the first and second seismic masses of the first rotor extending in parallel to the substrate, wherein the second rotor includes a third seismic mass and a fourth seismic mass that are deflectably supported with respect to the second rotor, a lateral deflection direction of the third and fourth seismic masses of the second rotor extending in parallel to the substrate, and wherein the first mass is connected to the third mass via a first rocker element in such a way that upon a lateral deflection of the first mass, the third mass is deflected in a direction opposite the lateral deflection of the first mass, the second mass being connected to the fourth mass via a second rocker element in such a way that upon a lateral deflection of the second mass, the fourth mass is deflected in a direction opposite the lateral deflection of the second mass, the first and second rocker elements being elastically connected to one another via a second coupling element in such a way that the lateral deflections of the first and second masses take place in phase opposition, and the lateral deflections of the third and fourth masses take place in phase opposition, wherein the double rotor is axially symmetric with respect to a first and/or a second axis of symmetry, the first axis of symmetry extending in the Y direction and being centrally situated between the first and second rotors, and the second axis of symmetry extending in the X direction through a center of gravity of the first rotor and a center of gravity of the second rotor.

2. The rotation rate sensor as recited in claim 1, wherein the first and second rotors are connected to the substrate at their center of gravity, via at least one spring.

3. The rotation rate sensor as recited in claim 1, wherein the first rotor is axially symmetric with respect to a third axis of symmetry and/or the second rotor is axially symmetric with respect to a fourth axis of symmetry, the third axis of symmetry extending in the Y direction through a center of gravity of the first rotor, and the fourth axis of symmetry extending in the Y direction through a center of gravity of the second rotor.

4. The rotation rate sensor as recited in claim 3, further comprising:
a first detection electrode system situated below and/or above the first rotor is symmetric with respect to the second and/or third axis of symmetry, and/or a second detection electrode system situated below and/or above the second rotor is symmetric with respect to the second and/or fourth axis of symmetry.

5. The rotation rate sensor as recited in claim 4, wherein a third detection electrode system is configured to detect a lateral deflection of the first and second seismic masses, and a fourth detection electrode system is configured to detect a lateral deflection of the third and fourth seismic masses, the third and fourth detection electrode systems including an electrode surface that is situated perpendicularly with respect to the substrate.

6. The rotation rate sensor as recited in claim 5, wherein the third and fourth detection electrode systems are designed in such a way that they detect rotational movements of the first and second rocker elements whose rotational axes extend perpendicularly with respect to the main plane of extension.

7. The rotation rate sensor as recited in claim 1, wherein the first coupling element is a first spring element that is centrally situated between the first and second rotors, the first spring element being formed by at least one leaf spring that is oriented predominantly in the Y direction.

8. The rotation rate sensor as recited in claim 1, wherein the first and second rocker elements each include a lever element that is connected to a seismic mass of the first rotor via a second spring element, and is connected to a seismic mass of the second rotor via a third spring element, each of the second and third spring elements being centrally situated at a seismic mass and/or the lever element being anchored to the substrate via a fourth spring element, the fourth spring element being centrally situated at the lever element and/or extending from the lever element in a direction of a center of the double rotor.

9. The rotation rate sensor as recited in claim 1, wherein the second coupling element includes a first additional and a second additional arm and a bending element, the first additional arm being situated at the first rocker element and the second additional arm being situated at the second rocker element, the bending element connecting the first additional arm to the second additional arm.

10. The rotation rate sensor as recited in claim 1, wherein the second coupling element, at least in one subarea, is situated above or below the first coupling element or includes, at least in one subarea, two subelements extending in parallel, one of the subelements being situated above the first coupling element and the other of the subelements being situated below the first coupling element.

* * * * *